United States Patent [19]
Kröger et al.

[11] Patent Number: 5,233,815
[45] Date of Patent: Aug. 10, 1993

[54] APPARATUS FOR MANIPULATING STACKS OF PAPER SHEETS AND THE LIKE

[75] Inventors: Holger Kröger, Norderstedt; Wolfram Wolf, Bilsen, both of Fed. Rep. of Germany

[73] Assignee: E.C.H. Will GmbH, Hamburg, Fed. Rep. of Germany

[21] Appl. No.: 886,434

[22] Filed: May 20, 1992

[30] Foreign Application Priority Data

May 24, 1991 [DE] Fed. Rep. of Germany ....... 4116969

[51] Int. Cl.$^5$ ...................... B65B 35/30; B65B 41/10; B65H 33/16
[52] U.S. Cl. ..................................... 53/540; 53/168; 53/252; 53/543
[58] Field of Search ................. 53/543, 540, 252, 251, 53/250, 168; 198/427

[56] References Cited

U.S. PATENT DOCUMENTS

| | | | |
|---|---|---|---|
| 2,141,212 | 12/1938 | Kimball et al. | 53/543 X |
| 3,226,912 | 1/1966 | Raye | 53/252 X |
| 4,157,408 | 6/1979 | Lingl | 198/427 X |
| 4,179,865 | 12/1979 | Pellaton | 53/252 X |
| 4,344,523 | 8/1982 | May et al. | 53/543 X |
| 4,555,892 | 12/1985 | Dijkman | 53/537 X |
| 4,683,708 | 8/1987 | Linder | 53/168 X |
| 4,768,329 | 9/1988 | Borrow | 53/543 |

FOREIGN PATENT DOCUMENTS 2708131 8/1978 Fed. Rep. of Germany.

Primary Examiner—James F. Coan
Attorney, Agent, or Firm—Peter K. Kontler

[57] ABSTRACT

Apparatus for supplying stacks of paper sheets or the like to two or more packing machines has a platform for collection of successive rows of stacks, e.g., by arresting sheets forming part of discrete scalloped streams of sheets. Two or more discrete carriages for tongs are utilized to remove stacks in any desired grouping from the platform and to deliver them to two or more discrete removing units serving to transport the stacks to discrete packing machines. Each removing unit can employ a set of two or more aligned conveyors. Each carriage is or can be driven by a separate prime mover, each carriage can support two or more tongs, or each carriage can support a single tongs. All such undertakings contribute to versatility of the apparatus, namely the apparatus can be operated to ensure equal distribution of stacks among the removing units or one or more selected removing units can receive larger or smaller numbers of stacks than the other unit or units.

11 Claims, 3 Drawing Sheets

APPARATUS FOR MANIPULATING STACKS OF PAPER SHEETS AND THE LIKE

BACKGROUND OF THE INVENTION

The invention relates to improvements in apparatus for manipulating stacks of sheets, panels, plates or analogous commodities, especially paper sheets. More particularly, the invention relates to improvements in apparatus for manipulating rows of stacked sheets of paper or the like. Still more particularly, the invention relates to improvements in apparatus wherein sheets or stacks of sheets are supplied to a collecting or gathering station where the stacks are caused to form an array and from which the stacks of the array are transferred to removing or evacuating means, e.g., for delivery to a packing machine. Apparatus to which the present invention pertains can be utilized for manipulation of stacks which are assembled from paper sheets, cardboard sheets or panels, paper board panels, metallic or plastic foils, sheets or panels and the like.

In many presently known production lines, sheets of paper or the like are piled up into stacks in such a way that several stacks are formed next to each other in a simultaneous operation. For example, a wide running strip of paper can be subdivided into a plurality of narrower strips or webs which are thereupon severed by suitable cross cutters to yield streams of successive partially overlapping or non-overlapping sheets. The sheets of each stream are gathered into a succession of stacks, and such gathering operation can take place at a collecting station whence the stacks are transferred onto removing conveyor means for transport to a packing machine, to storage or to another destination.

Published German patent application No. 27 08 131 discloses an apparatus wherein two packing machines are coupled with a single sheet making machine. Each packing machine is connected to the sheet making machine by a discrete conveyor. The sheet making machine turns out successive rows of eight stacks each. The arrangement is such that four stacks of each of a series of successively assembled rows of eight stacks each are conveyed to one of the packing machines and the other four stacks are conveyed to the other packing machine. If one of the two packing machines happens to be out of commission, all of the stacks of each row are conveyed to the other (operative) packing machine. To this end, the system which is disclosed in the aforementioned German patent application employs a rather complex and expensive transverse conveyor assembly which can transfer stacks from the inoperative packing machine to the other packing machine.

OBJECTS OF THE INVENTION

An object of the invention is to provide a stack manipulating apparatus which is more versatile than heretofore known apparatus.

Another object of the invention is to provide an apparatus which can distribute the output of a large sheet forming and sheet stacking machine among any desired practical number of processing or consuming machines, e.g., two or more stack packing machines.

A further object of the invention is to provide the apparatus with novel and improved means for transferring stacks of paper sheets or the like from a collecting or gathering station.

An additional object of the invention is to provide the apparatus with novel and improved means for removing stacks from the region of the collecting or gathering station.

Still another object of the invention is to provide an apparatus which can be installed in existing production lines as a superior, especially more versatile or flexible, substitute for heretofore known apparatus.

A further object of the invention is to provide a simple and compact apparatus which can simultaneously assemble, transfer and further convey large numbers of stacks of identical size or different stacks.

Another object of the invention is to provide an apparatus which can rapidly shift from delivery of stacks to a first number of consuming or processing machines to delivery of stacks to a different second number of consuming or processing machines.

An additional object of the invention is to provide an apparatus whose operation is not affected, or not unduly affected, by temporary malfunctioning or deceleration of the producing machine or machines and/or by temporary malfunctioning and/or deceleration of one or more processing or consuming machines.

Still another object of the invention is to provide a novel and improved method of manipulating sheets which are assembled into successive rows or other arrays of stacks on their way to one or more packing or other consuming or processing machines.

A further object of the invention is to provide a novel and improved method of transporting stacks of paper sheets or the like from a stack collecting and/or forming station to one or more packing machines wherein the stacks are confined in envelopes of paper or other suitable wrapping material.

SUMMARY OF THE INVENTION

The invention resides in the provision of an apparatus for gathering plural stacks of superimposed sheets at and for removing the stacks from a collecting station wherein the stacks form an array of stacks. The apparatus comprises means for delivering sheets to the collecting station, at least two stack removing units, and means for transferring stacks from the collecting station to the removing units. The transferring means includes a plurality of conveyors and means for operating the conveyors jointly or individually, i.e., each conveyor can be operated independently of each other conveyor or jointly with one or more conveyors as a unit.

In accordance with a presently preferred embodiment, each conveyor of the transferring means comprises at least one carriage, rails and/or other suitable means for confining the carriage to movements along a predetermined path, and at least one stack engaging device (e.g., in the form of tongs) on the carriage. The operating means of such transferring means comprises means for moving the carriages along the respective paths.

The carriages can be confined to reciprocatory movements along the respective paths between first positions at the collecting station so that the respective engaging devices can engage stacks of an array of stacks at the collecting station, and second positions at one of the removing units so that the respective engaging devices can release the engaged stacks to the one removing unit. The arrangement is preferably such that the confining means define paths which enable the respective devices to deliver stacks to any one of the removing units and to thus enhance the versatility of the apparatus.

The delivering means can include means for simultaneously supplying several streams of sheets from a sheet making machine (e.g., a machine employing one or more cutters which sever several webs or strips of paper to convert each web or strip into a succession of discrete sheets) to the collecting station. The delivering means can further include means for gathering the sheets of each stream into a succession of stacks at the collecting station.

Each removing unit can include means for transporting stacks to at least one packing machine. For example, each removing unit can transport stacks to a discrete packing machine.

The delivering means can be provided with or can constitute means for advancing sheets in a first direction, and the removing units can include means for advancing stacks in at least one second direction transversely of (e.g., at right angles to) the first direction.

At least one of the removing units can comprise a series of separately driven stack transporting conveyors. The separately driven stack transporting conveyors can comprise a first conveyor which serves to receive stacks from the transferring means and has a discharge end, and an independently driven second conveyor at the discharge end of the first conveyor. The first conveyor can comprise a plurality of independently operable discrete conveyors.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
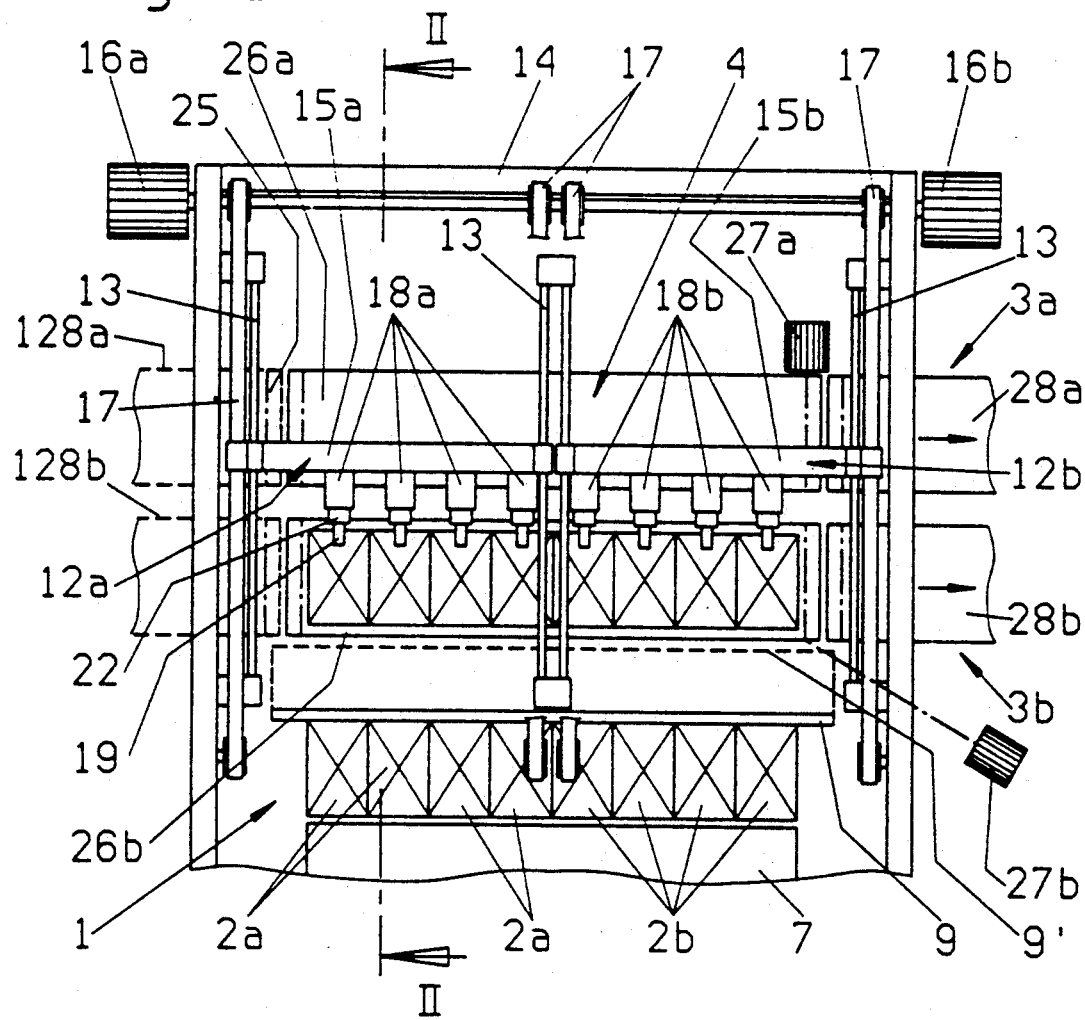
FIG. 1 is a schematic plan view of an apparatus which embodies one form of the invention and wherein the transferring means comprises two conveyors for sets of four stack engaging devices each.
Figure 2:
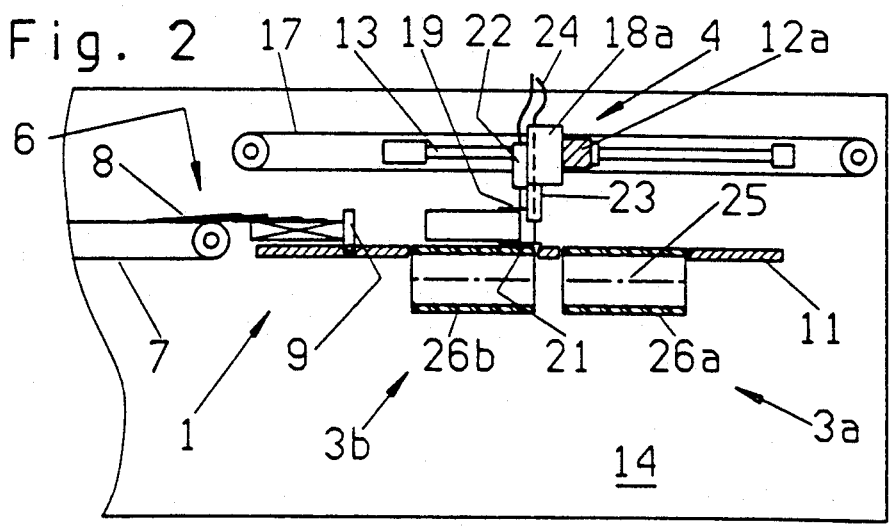
FIG. 2 is a vertical sectional view substantially as seen in the direction of arrows from the line II—II in FIG. 1.

Referring first to FIGS. 1 and 2, there is shown an apparatus which serves to gather arrays of aligned stacks at a collecting station 1 and to transfer stacks to two removing units 3a, 3b each of which can convey stacks to a discrete packing or other processing or consuming machine, not shown. In the illustrated apparatus, a full array of stacks at the station 1 comprises a row containing a total of eight stacks including four stacks 2a and four stacks 2b. The stacks 2a and/or 2b may but need not be of identical height and/or may but need not consist of sheets of identical size.

The stacks 2a, 2b of a row at the collecting station 1 can be obtained from a single wide strip or web of paper which is drawn off a large roll (not shown) and is subdivided into eight narrower strips or webs. Such narrower strips or webs are acted upon by one or more cross cutters (not shown) which convert each narrower web into a scalloped stream 6 (one shown in FIG. 2) of partially overlapping discrete sheets 8. Such streams are delivered to the collecting station 1 by discrete endless belt or chair conveyors 7 or by a single wide conveyor 7 (see FIG. 1). Successive sheets 8 of each stream 6 are caused to advance against a mobile abutment or stop 9 mounted on a platform or table 11 at the collecting station 1. FIG. 1 shows a single stop 9 which is common to the full row of eight stacks 2a, 2b. This stop is pivotable or otherwise retractible (e.g., into the platform 11) out of the path of stacks 2a, 2b so that such stacks can be engaged by the stack engaging devices 18a or 18b on two conveyors 12a, 12b forming part of a stack transferring system 4 which is used to transfer stacks from the collecting station 1 into the range of the stack removing unit 3a and/or 3b. That position of the stop 9 in which the latter is retracted from the path for advancement of stacks 2a, 2b with the engaging devices 18a, 18b is indicated in FIG. 1 by broken lines, as at 9'. Such mode of accumulating stacks of paper sheets or the like on a platform or table is known and need not be described in further detail. All that counts is that the apparatus be provided with means for gathering successive rows or other suitable arrays of stacks not later than at the collecting station 1 so that the engaging devices 18a and/or 18b can be actuated in order to transfer stacks onto or otherwise into the range of the removing unit 3a and/or 3b.

Each of the two conveyors 12a, 12b includes a carriage 15a, 15b which is reciprocable in and counter to the direction of delivery of sheets 8 to the platform 11 and is confined to such reciprocatory movement by suitable guide rails 13 or the like. The carriage 15a supports the four stack engaging devices 18a each of which can constitute a tongs, and the carriage 15b supports the four stack engaging devices 18a each of which can but need not be identical with a device 18a. The guide rails 13 for the carriages 15a, 15b are mounted in or form part of a frame 14. The means for moving the carriage 15a along the respective guide rails 13 includes a first reversible electric motor 16a or another suitable prime mover, and the means for moving the carriage 15b along the respective rails 13 includes a second reversible electric motor 16b or another suitable prime mover. Toothed belt or chain transmissions 17 are provided to transmit motion from the output elements of the motors 16a, 16b to the respective carriages 15a, 15b. It is also possible to employ ratchet-and-pinion drives, fluid-operated cylinder and piston units or other suitable means in lieu of the transmissions 17 and/or motors 16a, 16b. These motors can be operated independently of each other, i.e., the carriages 15a, 15b can be moved as a unit or independently of one another at different speeds and/or through different distances. Furthermore, the carriage 15a can be held at a standstill when the carriage 15b is in motion or vice versa.

Each of the illustrated stack engaging devices 18a, 18b is a tongs including an upper jaw or claw 19 and a lower jaw or claw 21 (see FIG. 2). The means for moving the upper jaws 19 comprises fluid-operated (hydraulic or pneumatic) motors 22 or other suitable actuating devices, and the means for moving the lower jaws 21 comprises fluid-operated (hydraulic or pneumatic) motors 23 or other suitable actuating devices. The jaws 19, 21 of an engaging device 18a or 18b are moved toward each other to clamp a stack 2a or 2b at the collecting station 1, and such jaws are moved apart to release a stack 2a or 2b when the thus released stack is ready to be accepted by the removing unit 3a or 3b. The motors 22, 23 share the movements of the respective carriages 15a, 15b; therefore, such motors are connected to a source of pressurized hydraulic or pneumatic fluid and/or to a source of electrical energy by one or more flexible conduits or conductors 24 (two indicated in FIG. 2). The conductors or conduits 24 for all motors 22, 23 on the carriage 15a preferably form a first flexible cable, and the conductors or conduits for all motors 22, 23 on the carriage 15b preferably form a second flexible cable.

Each of the removing units 3a, 3b comprises a series of discrete stack transporting conveyors. The conveyors 26a, 26b of the units 3a, 3b respectively serve to receive stacks 2a and/or 2b from the transferring system 4, i.e., from the stack engaging devices 18a and/or 18b. The removing units 3a, 3b further respectively comprise discrete second stack transporting conveyors 28a, 28b which can be driven independently of and are adjacent the discharge ends of the respective first conveyors 26a, 26b. For example, each conveyor 28a, 28b can deliver stacks 2a and/or 2b to a discrete packing machine. The conveyors 26a, 26b and 28a, 28b which are shown in FIGS. 1 and 2 are belt or band conveyors with endless flexible elements trained over sets of pulleys whose axes are indicated by phantom lines 25.

It is further within the purview of the invention to employ removing units 3a, 3b each of which further comprises a third discrete stack transporting conveyor 128a, 128b (indicated in FIG. 1 by broken lines). The prime movers 27a, 27b for the respective conveyors 26a, 26b are then reversible so that the conveyor 26a can deliver stacks 2a and/or 2b to the conveyor 28a or 128a, and that the conveyor 26b can deliver stacks 2a and/or 2b to the conveyor 28b or 128b. This even further enhances the versatility of the improved apparatus because the removing units 3a, 3b can advance stacks to consuming or processing machines at the left-hand side and/or at the right-hand side of the frame 14.

Each of the prime movers 27a, 27b can include or constitute a reversible electric motor which drives one or more pulleys of the respective conveyor 26a, 26b in a selected direction and at a selected speed.

Figure 3:
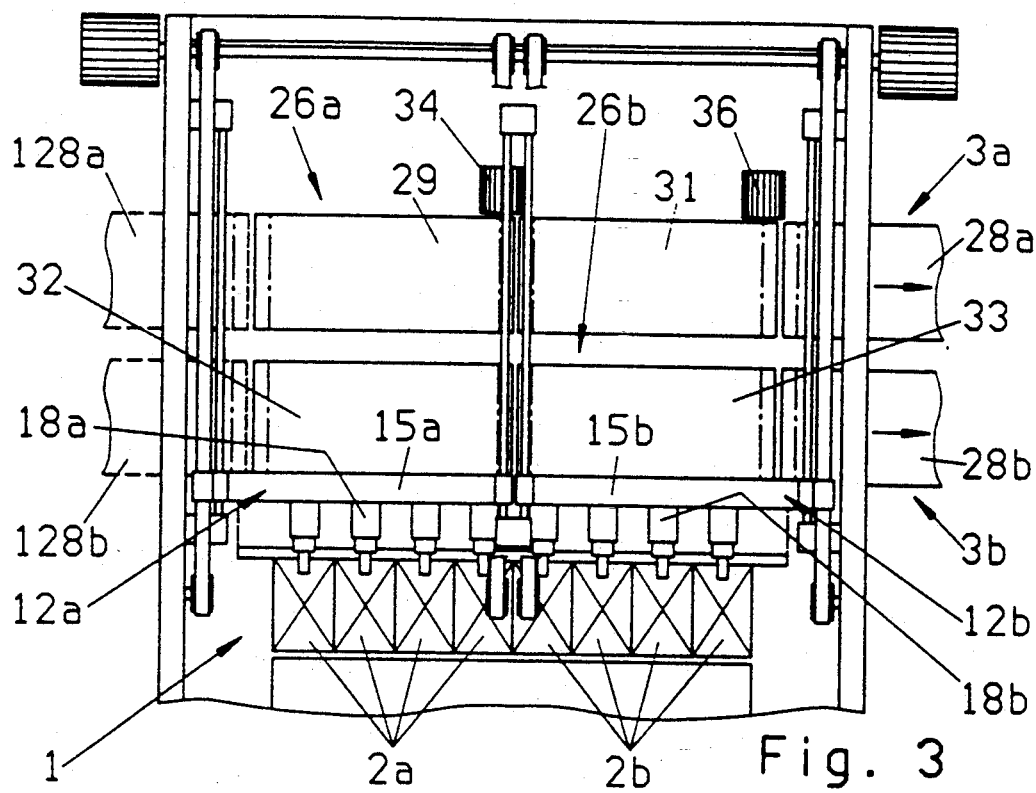
FIG. 3 shows the structure which is similar to that of FIG. 1 but with the conveyors of the transferring means in different positions.
Figure 4:
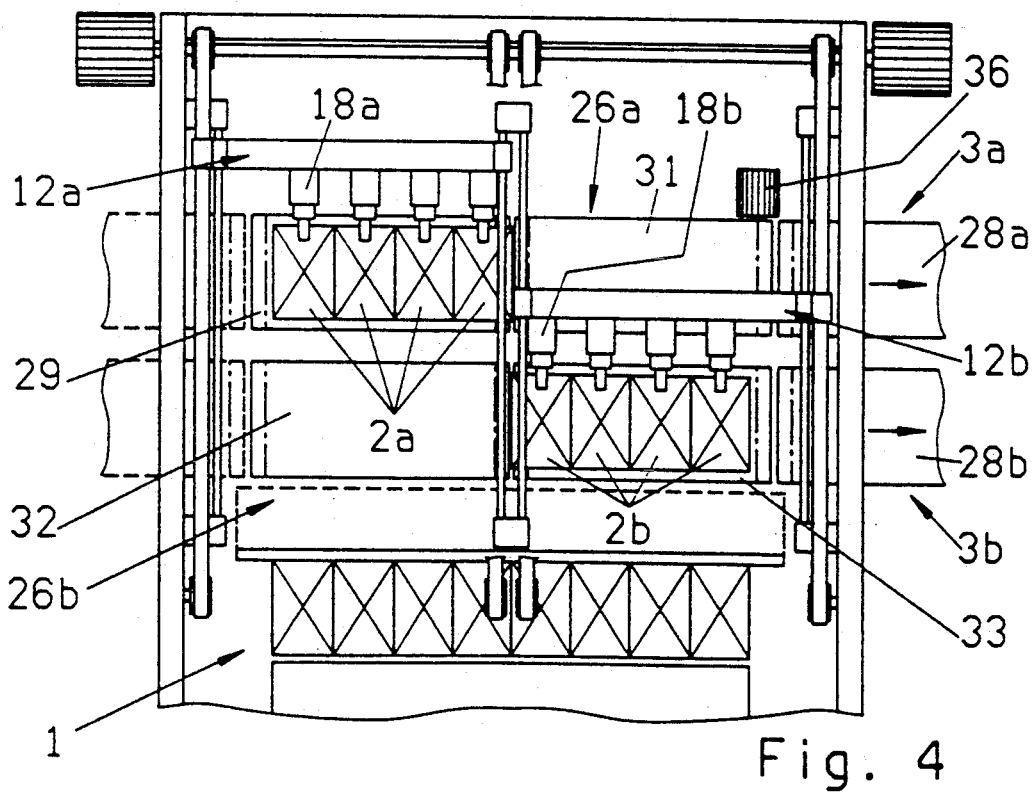
FIG. 4 shows the structure of FIG. 3 but with one conveyor of the transferring means in a position other than that shown in FIG. 1.

The apparatus which are shown in FIGS. 3 and 4 are practically identical with the apparatus of FIGS. 1 and 2. Any differences of note will be pointed out in connection with the following description of the mode of operation of the improved apparatus.

FIG. 1 shows a freshly assembled array or row of four stacks 2a and four stacks 2b at the collecting station 1, and the preceding row of eight stacks (four stacks 2a and four stacks 2b) which is in the process of being deposited onto the conveyor 26a of the removing unit 3b. The stacks of the preceding row are still held by the jaws 19, 21 of the respective engaging devices 18a, 18b or such stacks are in the process of being released by the respective jaws so that the conveyor 26b can deliver a full row of eight aligned stacks onto the conveyor 28b or 128b of the removing unit 3b. The conveyor 26a is or can be arrested. The motor 27b for the conveyor 26b is started as soon as the eight stacks 2a, 2b of the preceding row are properly deposited on the upper reach of the conveyor 26b, and the latter then delivers the stacks to the conveyor 28b or 128b. If the conveyors 28b, 128b are continuously driven, the motor 27b accelerates the conveyor 26b to (or at least close to) the speed of that conveyor (28b or 128b) which is to receive the preceding row of stacks 2a and 2b. This ensures that the configuration of the stacks does not change during transfer from the discharge end of the conveyor 26b onto the conveyor 28b or 128b.

The motors 16a, 16b are then started in directions to return the carriages 15a, 15b to the collecting station 1 so that the devices 18a, 18b can engage and entrain the row stacks 2a, 2b resting on the platform 11. The same procedure is repeated as often as necessary until or unless the next row or rows of stacks are to be transferred onto the conveyor 26a of the removing unit 3a or partly onto the conveyor 26a and partly onto the conveyor 26b. The conveyor 26b can be arrested while the motors 16a, 16b are operative to return the carriages 15a, 15b from the positions of FIG. 1 back to the collecting station 1.

FIG. 3 shows the carriages 15a, 15b of the two conveyors 12a, 12b forming part of the transferring system at the collecting station 1. The devices 18a, 18b are in the process of engaging the respective stacks 2a, 2b for transfer onto the conveyor 26a or 26b. The main difference between the apparatus of FIGS. 1-2 and FIG. 3 is that the conveyor 26a of FIG. 3 comprises two independently operable discrete conveyors 29, 31 which can be driven by discrete prime movers 34, 36 (e.g., reversible electric motors), and that the conveyor 26b also comprises two independently operable discrete conveyors 32, 33 which can be driven by discrete prime movers (not shown) corresponding to the prime movers 34, 36. This enables the conveyor 29 to deliver stacks 2a to the conveyor 31 or 128a or stacks 2b to the conveyor 128a; the conveyor 31 to deliver stacks 2a to the conveyor 28a or stacks 2b to the conveyor 28a or 29; the conveyor 32 to deliver stacks 2a to the conveyor 33 or 128b or stacks 2b to the conveyor 128b; and the conveyor 33 to deliver stacks 2b to the conveyor 28b or 32 or stacks 2a to the conveyor 28b. By way of example, the engaging devices 18a, 18b can be caused to respectively transfer stacks 2a, 2b from the collecting station 1 onto the conveyors 29, 31, onto the conveyors 32, 33, onto the conveyors 29, 33 or onto the conveyors 32, 31. The thus transferred stacks can be advanced onto the conveyors 28a, 28b and/or 128a, 128b. If the conveyors 28a, 28b are to receive stacks from the neighboring conveyors 31, 33, the devices 18a deliver stacks 2a onto the conveyor 29 which advances the thus received stacks 2a onto the conveyor 31 for advancement onto the conveyor 28a, and the devices 18b deliver stacks 2b onto the conveyor 33 which advances the thus received stacks 2b onto the conveyor 28b. At such time, the conveyors 32 and 31 are or can be idle.

FIG. 4 illustrates the apparatus of FIG. 3 (i.e., the conveyor 26a comprises two discrete conveyors 29, 31 and the conveyor 26b comprises two discrete conveyors 32, 33) in the process of transferring stacks onto the conveyors 29 and 33, i.e., to two different removing units 3a, 3b. The conveyor 29 is at a standstill while its upper reach is in the process of receiving four stacks 2a from the engaging devices 18a. The motor 36 is assumed to drive the conveyor 31 at the speed of the conveyor 28a; this ensures that the stacks 2a which have been deposited onto the conveyor 29 are set in motion and advance toward and onto the conveyor 28a as soon as the motor 34 (not seen in FIG. 4) is started to accelerate the conveyor 29, preferably to the speed of the conveyor 31. The conveyor 32 is or can remain idle. The engaging devices 18b are in the process of depositing four stacks 2b onto the conveyor 33 which is at a standstill. This conveyor is started by the respective motor (not shown in FIG. 4) as soon as the transfer of four stacks 2b onto its upper reach is completed, and the conveyor 33 then delivers the stacks 2b onto the conveyor 28b for advancement to the respective packing or other processing or consuming machine. The conveyors 28a and 28b can be driven continuously irrespective of the condition (standstill or running) of the adjacent conveyors 31, 33. The same applies for the conveyors 128a, 128b and 32 if the stacks 2a are to be delivered onto the conveyor 128a and the stacks 2b are to be delivered onto the conveyor 128b. The station 1 collects a fresh array or row of stacks 2a, 2b while the stacks of the previously formed row or array are in the process of being delivered to the conveyors 29 and 33.

If the apparatus is constructed in a manner as shown in FIG. 1, i.e., that the removing unit 3a comprises a single conveyor 26a and the removing unit 3b comprises a single conveyor 26b (in addition to the conveyor 28a and/or 128a of the unit 3a and in addition to the conveyor 28b and 128b of the unit 3b), and if the transfer of stacks 2a, 2b is carried out in a manner as shown in FIG. 4, each of the conveyors 26a, 26b receives one-half of a full row of stacks. If the stacks 2a and 2b are to be transferred onto the conveyors 28a, 28b in a simultaneous operation, the conveyor 28b is idle while the devices 18a transfer the stacks 2a from the collecting station 1 onto the left-hand portion of the upper reach of the single conveyor 26a. This conveyor is then set in motion to advance the four stacks 2a next to the receiving end of the conveyor 28a. The conveyor 26a is thereupon arrested and the devices 18b transfer the four stacks 2b onto the conveyor 26b which is then idle. The conveyors 26a, 26b are thereupon set in motion to simultaneously deliver the stacks 2a, 2b onto the conveyors 28a, 28b, respectively.

The just described mode of operation is not as advantageous as the mode of manipulating stacks in an apparatus wherein each of the conveyors 26a, 26b comprises two discrete conveyors 29, 31 and 32, 33, respectively, because the stacks 2a must be repeatedly accelerated and decelerated before they reach the conveyor 28a which can result in some deformation of the stacks 2a on their way from the station 1 onto the conveyor 28a. This does not apply for the stacks 2b if such stacks are to be transferred from the right-hand half of the station 1 onto the conveyor 28b, i.e., each of these stacks is transferred first onto the right-hand portion of the upper reach of the one-piece conveyor 26b, and the next step involves the transfer of stacks from the conveyor 26b onto the conveyor 28b.

For the aforedescribed reasons, it is often desirable and advantageous to construct the apparatus in a manner as shown in FIGS. 3 and 4. Thus, the conveyor 29 can receive stacks 2a from the engaging devices 18a to deliver the thus received stacks to the conveyor 31 which is in motion, preferably at the speed of the conveyor 28a, so that the stacks 2a need not be decelerated and accelerated on their way from the conveyor 29 onto the conveyor 28a. The same holds true for the conveyors 33, 32 and 128b if the stacks 2b are to be transferred from the right-hand portion of the collecting station 1 onto the conveyor 128b (via conveyors 33 and 32). Since the conveyor 31 can be driven simultaneously with the conveyor 28a (if the stacks 2a are to be transferred from the station 1 onto the conveyor 28a via devices 18a and conveyors 29, 31), the interval of time which elapses during transfer of stacks 2a from the station 1 onto the conveyor 28 is surprisingly short. The same applies when the conveyor 32 is driven simultaneously with the conveyor 128b if the stacks 2b are to be transferred from the right-hand portion of the station 1 onto the conveyor 128b (through the medium of the engaging devices 18b and conveyors 33, 32). The apparatus of FIGS. 3 and 4 can be put to use with particular advantage if the requirements of the machines receiving stacks from the conveyors 28a, 28b and/or 128a, 128b are high, i.e., if the stacks must be transported at a high speed and are likely to undergo pronounced acceleration and deceleration. A reduction of the total number of accelerations and decelerations reduces the likelihood of deformation of the stacks on their way to the selected processing or consuming stations.

Figure 5:
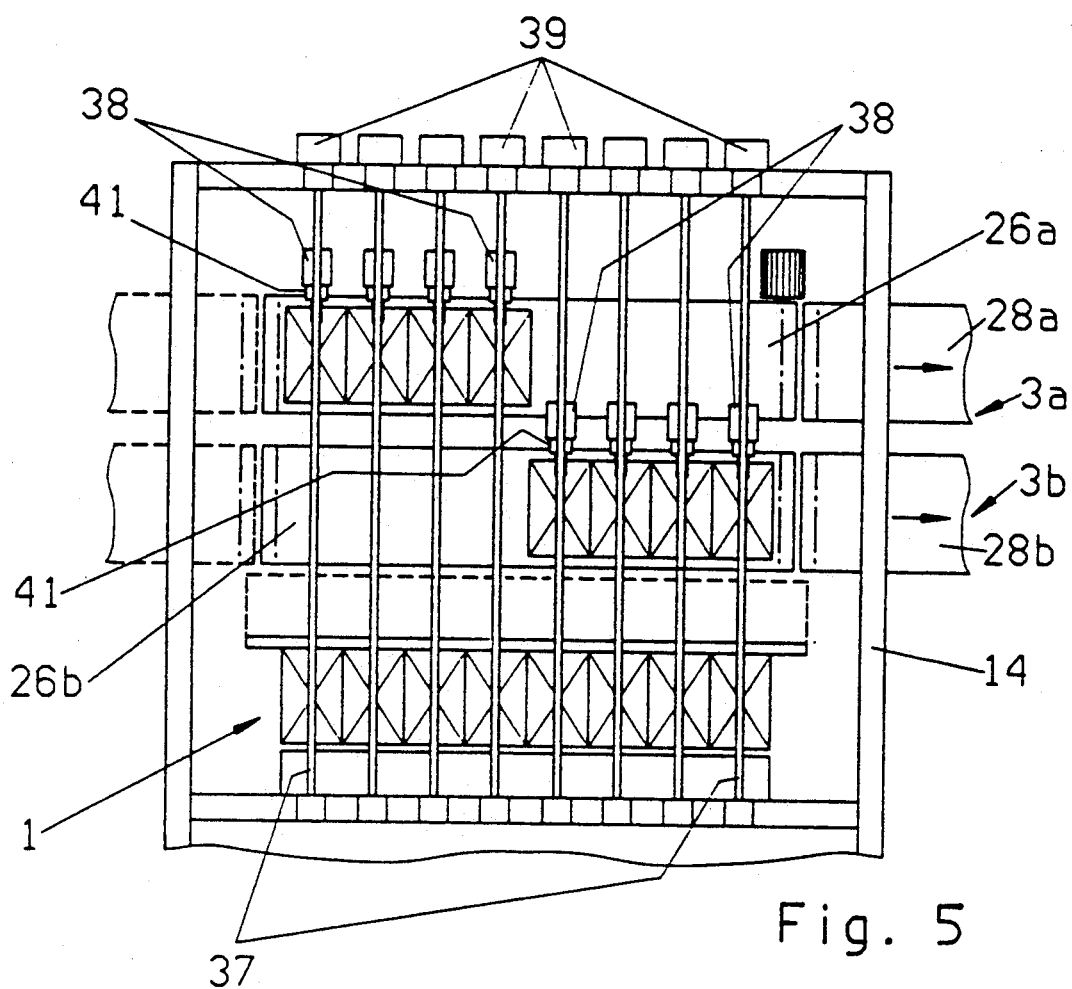
FIG. 5 is a plan view of a modified apparatus wherein the transferring means comprises eight discrete conveyors.

FIG. 5 shows a different apparatus wherein each stack engaging device 38 of the transferring system is mounted on a discrete carriage 41 and each carriage is reciprocable along a discrete track or guide means 37. Furthermore, the transferring system comprises a discrete reversible electric motor 39 or another suitable prime mover for each engaging device 38. By way of example, each prime mover 39 can comprise or can be combined with a so-called piston rod-free band cylinder. Such cylinders are readily available on the market and are suitable for use in the apparatus of FIG. 5.

An important advantage of the apparatus of FIG. 5 is that its versatility is even more pronounced than that of the heretofore described apparatus of the type shown in FIGS. 1 to 4. Thus, each gripper 38 can be used to deliver individually a stack 2a or 2b from the platform of the collecting station 1 onto the conveyor 26a or 26b of the removing unit 3a or 3b. The transfer of stacks 2a and/or 2b can take place simultaneously or at any desired intervals. For example, all of the engaging devices 38 can be operated to transfer stacks from the station 1 onto the conveyor 26a or 26b (i.e., the ratio of transfer from the station 1 onto the conveyor 26a or 26b can be 0:1 or 1:0. It is also possible to select a ratio of 1:1 (each of the conveyors 26a, 26b receives one-half of a full array of stacks 2a, 2b) or any other ratio such as 5:3, 3:5, 6:2, 2:6, 7:1, 1:7. It will be seen that the flexibility or versatility of the apparatus of FIG. 5 is even more pronounced than that of the apparatus of FIGS. 1 to 4.

The improved apparatus is susceptible of many additional modifications without departing from the spirit of the invention. For example, the two discrete motors 27a, 27b for the conveyors 26a, 26b which are shown in FIG. 1 can be replaced with a single reversible prime mover or with a non-reversible prime mover (if the conveyors 28a, 28b or 128a, 128b are omitted). Analogously, the apparatus of FIG. 5 can employ discrete prime movers 39 for pairs of engaging devices 38. Furthermore, the number of stacks 2a, 2b in an array can exceed or can be less than eight, and the apparatus can be designed to transfer stacks of paper sheets or the like from a single collecting station 1 to three or more discrete removing units. This might be desirable and advantageous if each of the removing units merely comprises two conveyors, i.e., if the conveyors 28a, 28b or 128a, 128b or 28a, 128b or 28b, 128a are omitted.

It is also possible to utilize stack engaging devices which do not comprise tongs with a pair of jaws, or to utilize engaging devices each of which comprises two or more tongs or each of which comprises a tongs with two or more pairs of jaws (for example, if the stacks 2a and/or 2b are rather large and heavy).

An important advantage of the improved apparatus is its versatility. The apparatus can be rapidly converted to any one of a large number of different modes of operation to satisfy the requirements of a set of two or more discrete processing or consuming (for example, packing) machines.

An advantage of removing units which comprise sets of the or more discrete conveyors is that they render it possible to establish a substantially continuous delivery of stacks to one or more processing machines while the transfer system including the stack engaging devices 18a, 18b or 38 operates intermittently.

A further important advantage of the improved apparatus is that the ratio of stacks which are being delivered to selected consuming or processing machines can be varied practically at will and is dependent primarily only on the number of stacks forming a complete array. This renders it possible to take into consideration eventual malfunctioning of one or more consuming or processing machines by increasing the rate of delivery of stacks to the machines whose operation is satisfactory and reducing or interrupting the delivery of stacks to one or more defective or slower machines. This is of considerable importance in production lines wherein stacks are to be delivered to a number of discerte consuming or processing machines because it is not necessary to shut down the entire production line if at least one consuming or processing machine remains operative.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for gathering plural stacks of sheets at, and for removing the stacks from, a collecting station wherein the stacks form an array of stacks, comprising means for delivering sheets to said station; at least two stack removing units; and means for transferring stacks from said station to said removing units, comprising a plurality of conveyors and means for operating said conveyors jointly or individually, said conveyors defining paths for delivery of stacks to any one of said removing units.

2. The apparatus of claim 1, wherein each of said conveyors comprises at least one carriage, means for confining the carriage to movements along the respective path, and at least one stack engaging device on the carriage, said operating means comprising means for moving said carriages along the respective paths.

3. The apparatus of claim 2, wherein said carriages are reciprocable along the respective paths between first positions at said station so that the respective devices can engage stacks of an array of stacks at said station and second positions at one of said removing units so that the respective devices can release the engaged stacks to the one removing unit.

4. The apparatus of claim 1, wherein at least one of said removing units comprises a series of separately driven stack transporting conveyors.

5. The apparatus of claim 1, wherein said delivering means includes means for simultaneously supplying several streams of sheets from a sheet making machine to said station.

6. The apparatus of claim 1, wherein said delivering means includes means for supplying several streams of sheets to said station and means for gathering the sheets of each of said streams into a succession of stacks at said station.

7. The apparatus of claim 1, wherein each of said removing units includes means for transporting stacks to at least one packing machine.

8. The apparatus of claim 1, wherein said delivering means includes means for advancing sheets in a first direction and said removing units include means for advancing stacks in at least one second direction transversely of said first direction.

9. Apparatus for gathering plural stacks at, and for removing the stacks from, a collecting station wherein the stacks form an array of stacks, comprising means for delivering sheets to said station; at least two stack removing units, at least one of said removing units comprising a series of separately driven stack transporting conveyors; and means for transferring stacks from said station to said removing units, comprising a plurality of conveyors and means for operating said conveyors jointly and individually.

10. The apparatus of claim 9, wherein said separately driven conveyors comprise a first conveyor arranged to receive stacks from said transferring means and having a discharge end, and an independently driven second conveyor at said discharge end.

11. The apparatus of claim 10, wherein said first conveyor comprises a plurality of independently operable discrete conveyors.

* * * * *